United States Patent
Rutz et al.

(10) Patent No.: US 8,697,815 B2
(45) Date of Patent: *Apr. 15, 2014

(54) SILANE-FUNCTIONAL POLYESTERS IN MOISTURE-CURING COMPOSITIONS BASED ON SILANE-FUNCTIONAL POLYMERS

(75) Inventors: Daniele Rutz, Zürich (CH); Marcel Oertli, Zürich (CH); Barbara Jucker, Zürich (CH)

(73) Assignee: Sika Technology AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/305,473

(22) Filed: Nov. 28, 2011

(65) Prior Publication Data
US 2012/0298299 A1 Nov. 29, 2012

Related U.S. Application Data

(63) Continuation of application No. PCT/EP2010/057295, filed on May 27, 2010.

(30) Foreign Application Priority Data

May 27, 2009 (EP) .................................. 09161264

(51) Int. Cl.
C08L 67/02 (2006.01)
C08L 67/00 (2006.01)
C09J 7/02 (2006.01)

(52) U.S. Cl.
USPC ...................... 525/440.01; 525/446; 156/329

(58) Field of Classification Search
None
See application file for complete search history.

(56) References Cited

U.S. PATENT DOCUMENTS

| | | | |
|---|---|---|---|
| 3,971,751 A | 7/1976 | Isayama et al. | |
| 4,408,021 A | 10/1983 | Penn | |
| 4,424,244 A * | 1/1984 | Puskadi | 428/40.6 |
| 4,434,126 A * | 2/1984 | McGary et al. | 264/303 |
| 4,474,933 A | 10/1984 | Huber et al. | |
| 6,008,305 A | 12/1999 | Wang et al. | |
| 6,048,579 A | 4/2000 | Wang et al. | |
| 6,207,766 B1 | 3/2001 | Doi et al. | |
| 6,310,170 B1 * | 10/2001 | Johnston et al. | 528/38 |
| 6,375,789 B1 * | 4/2002 | Katz et al. | 156/329 |
| 6,525,162 B1 * | 2/2003 | Altounian | 528/81 |
| 6,749,943 B1 * | 6/2004 | Tangen et al. | 428/447 |
| 6,967,226 B2 * | 11/2005 | Shah | 524/590 |
| 7,019,074 B2 * | 3/2006 | Nakamura et al. | 525/63 |
| 7,674,840 B2 * | 3/2010 | Stanjek et al. | 521/154 |
| 7,771,622 B2 * | 8/2010 | Zhou | 252/511 |
| 8,012,302 B2 * | 9/2011 | Jucker et al. | 156/329 |
| 8,207,252 B2 * | 6/2012 | Huang et al. | 524/261 |
| 2003/0051610 A1 | 3/2003 | Dux et al. | |
| 2004/0143034 A1 * | 7/2004 | Primke et al. | 523/176 |
| 2006/0142532 A1 * | 6/2006 | Wintermantel et al. | 528/59 |
| 2006/0155045 A1 | 7/2006 | Tsuno et al. | |
| 2007/0088137 A1 * | 4/2007 | Georgeau et al. | 525/487 |
| 2007/0100111 A1 * | 5/2007 | Stanjek et al. | 528/44 |
| 2008/0058492 A1 | 3/2008 | Griswold | |
| 2008/0125539 A1 * | 5/2008 | Mack | 524/588 |
| 2008/0221245 A1 * | 9/2008 | Huang et al. | 524/263 |
| 2008/0293908 A1 * | 11/2008 | Ludewig et al. | 528/26 |
| 2009/0131591 A1 * | 5/2009 | Schindler et al. | 525/105 |
| 2009/0156737 A1 * | 6/2009 | Schindler et al. | 524/588 |
| 2010/0040894 A1 * | 2/2010 | Rosenau et al. | 428/447 |

FOREIGN PATENT DOCUMENTS

| | | |
|---|---|---|
| EP | 0 096 250 A1 | 12/1983 |
| EP | 0 202 491 A2 | 11/1986 |
| EP | 0 354 472 A1 | 2/1990 |
| WO | WO 02/48228 A2 | 6/2002 |
| WO | WO 2004/005420 A1 | 1/2004 |
| WO | WO 2007/096355 A1 | 8/2007 |
| WO | WO 2008/027496 A2 | 3/2008 |

OTHER PUBLICATIONS

International Search Report (PCT/ISA/210) issued on Aug. 20, 2010, by European Patent Office as the International Searching Authority for International Application No. PCT/EP2010/057296.

(Continued)

Primary Examiner — Robert S Loewe
(74) Attorney, Agent, or Firm — Buchanan Ingersoll Rooney PC

(57) ABSTRACT

A silane-functional polyester of formula (I):

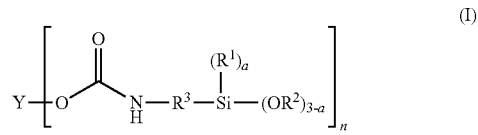

wherein
Y is an n-valent residue of a polyester P which is solid at room temperature and terminated by hydroxy groups, after removal of n hydroxy groups;
$R^1$ is a linear or branched, monovalent carbon residue having 1 to 12 carbon atoms, optionally having one or more C—C multiple bonds and/or having optionally cycloaliphatic and/or aromatic portions;
$R^2$ is an acyl residue or a linear or branched, monovalent hydrocarbon residue having 1 to 12 carbon atoms, optionally having one or more C—C multiple bonds and/or having optionally cycloaliphatic and/or aromatic portions;
$R^3$ is a linear or branched, divalent hydrocarbon residue having 1 to 12 carbon atoms, optionally having cyclic and/or aromatic portions, and optionally having one or more heteroatoms;
the index a has a value of 0, 1 or 2; and
the index n has a value of 1 to 3.

19 Claims, No Drawings

(56) References Cited

OTHER PUBLICATIONS

Written Opinion (PCT/ISA/237) issued on Aug. 20, 2010, by European Patent Office as the International Searching Authority for International Application No. PCT/EP2010/057296.
Notification of Transmittal of Translation of the International Preliminary Report on Patentability (Forms PCT/IB/338 and PCT/IB/373) and the Written Opinion of the International Searching Authority (Form PCT/ISA/237) issued on Dec. 29, 2011, in the corresponding International Application No. PCT/EP2010/057295. (11 pages).
International Search Report (PCT/ISA/210) issued on Aug. 3, 2010, by European Patent Office as the International Searching Authority for International Application No. PCT/EP2010/057295.
Written Opinion (PCT/ISA/237) issued on Aug. 3, 2010, by European Patent Office as the International Searching Authority for International Application No. PCT/EP2010/057295.

* cited by examiner

SILANE-FUNCTIONAL POLYESTERS IN MOISTURE-CURING COMPOSITIONS BASED ON SILANE-FUNCTIONAL POLYMERS

RELATED APPLICATIONS

This application claims priority as a continuation application under 35 U.S.C. §120 to PCT/EP2010/057295, which was filed as an International Application on May 27, 2010 designating the U.S., and which claims priority to European Application No. 09161264.8 filed in Europe on May 27, 2009. The entire contents of these applications are hereby incorporated by reference in their entireties.

FIELD

Disclosed are silane-functional polyesters, which can be used as a component of moisture-curing compositions such as adhesives, sealants or coatings based on silane-terminated polymers.

BACKGROUND INFORMATION

For many applications it can be desirable to use moisture-curing compositions as adhesives, sealants or coatings having high initial strength. For example, adhesives with a low initial strength can have the disadvantage that the parts joined by an adhesive are to be kept in a fixed position up to the point that a certain strength has built so that they remain in the desired position.

There are different approaches for providing moisture-curing compositions with high initial strengths. Two-component or reactive warm- or hot-melt compositions, for example, warm- or hot-melt adhesives, so-called warm or hot melts, can be used. A combination of both approaches can also be used.

In this case, warm- or hot-melt adhesives can have the disadvantage that their viscosity increases dramatically immediately after application. Because of this, for example, corrections in the alignment of two substrates to be bonded after joining are complicated. Furthermore, for many applications these adhesives are generally not flexible enough to compensate for thermal expansion.

In addition to pure warm- or hot-melt adhesives, in which the moisture-reactive components are completely, or at least largely, present as components that are solid at room temperature, warm- or hot-melt adhesives can be used in which only a portion of the moisture-reactive components is solid at room temperature. Generally, they contain a reactive or nonreactive melt component in addition to a liquid, reactive component. In order to obtain compositions that have the best possible mechanical properties, reactive melt components can be used, wherein the spectrum of the same is rather broad. For moisture-curing compositions based on silane-functional polymers, reaction products of any polyol with polyisocyanates can be used, which are then reacted with amino- or mercaptosilanes. For example, such a composition is described in WO 2004/005420 A1.

SUMMARY

According to an exemplary aspect, disclosed is a silane-functional polyester of formula (I):

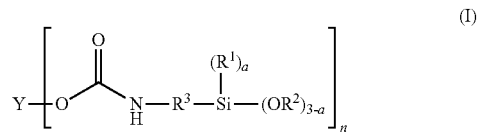

wherein
Y is an n-valent residue of a polyester P which is solid at room temperature and terminated by hydroxy groups, after removal of n hydroxy groups;
$R^1$ is a linear or branched, monovalent carbon residue having 1 to 12 carbon atoms, optionally having one or more C—C multiple bonds and/or having optionally cycloaliphatic and/or aromatic portions;
$R^2$ is an acyl residue or a linear or branched, monovalent hydrocarbon residue having 1 to 12 carbon atoms, optionally having one or more C—C multiple bonds and/or having optionally cycloaliphatic and/or aromatic portions;
$R^3$ is a linear or branched, divalent hydrocarbon residue having 1 to 12 carbon atoms, optionally having cyclic and/or aromatic portions, and optionally having one or more heteroatoms;
the variable a has a value of 0, 1 or 2; and
the variable n has a value of 1 to 3.

According to another exemplary aspect, disclosed is a method for bonding two substrates S1 and S2, the method comprising:
i) applying a composition comprising an exemplary polyester on a substrate S1 and/or a substrate S2;
ii) contacting the substrates S1 and S2 via the applied composition within an open time of the composition; and
iii) curing the composition with water,
wherein the substrates S1 and S2 are identical to or different from each other.

According to another exemplary aspect, disclosed is a method for bonding, sealing or coating, the method comprising:
i) applying a composition comprising an exemplary polyester on a substrate S1 and/or between two substrates S1 and S2; and
ii) curing the composition with water,
wherein the substrates S1 and S2 are identical to or different from each other.

According to another exemplary aspect, disclosed is a two-component moisture-curing adhesive, sealant or coating based on a silane-terminated polymer, comprising:
a component A comprising at least one exemplary silane-functional polyester and at least one silane-terminated polymer; and
a component B comprising water.

According to another exemplary aspect, disclosed is a composition, comprising:
at least one exemplary silane-functional polyester; and
at least one silane-terminated polymer STP.

DETAILED DESCRIPTION

Disclosed is a silane-functional polymer, which as a component in moisture-curing compositions based on silane-functional polymers leads to compositions that can be used as adhesives, sealants or coatings with improved initial strength.

Surprisingly, it was discovered that specific silane-functional polyester according to claim 1 solve this task.

From the large number of possible components that are used in moisture-curing compositions based on silane-terminated polymers, it was not obvious in any way for the person skilled in the art to select specific silane-functional polyesters such as those described herein that exhibit a remarkable positive effect on the initial strength and the mechanical properties of the composition.

In a first exemplary aspect, a silane-functional polyester of formula (I) is provided.

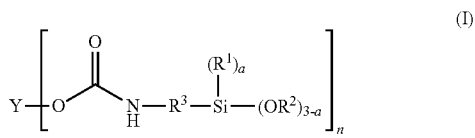

Residue Y is an n-valent residue of a polyester P that is solid at room temperature and terminated by hydroxy groups, after removal of n hydroxy groups.

Residue $R^1$ is a linear or branched, monovalent carbon residue having 1 to 12 carbon atoms, optionally having one or more C—C multiple bonds and/or having optionally cycloaliphatic and/or aromatic portions. For example, $R^1$ is a methyl, ethyl or isopropyl group.

Residue $R^2$ is an acyl residue or a linear or branched, monovalent hydrocarbon residue having 1 to 12 carbon atoms, optionally having one or more C—C multiple bonds and/or having optionally cycloaliphatic and/or aromatic portions. For example, residue $R^2$ is an acyl or alkyl group having 1 to 5 carbon atoms, for example, a methyl or an ethyl or an isopropyl group.

Residue $R^3$ is a linear or branched, divalent hydrocarbon residue having 1 to 12 carbon atoms, optionally having cyclic and/or aromatic portions, and optionally having one or more heteroatoms. For example, residue $R^3$ is an alkylene residue having 1 to 3 carbon atoms, for example, 3 carbon atoms.

Furthermore, the index a has a value of 0, 1 or 2, for example, 0 or 1.

Index n has a value of 1 to 3, for example, 2.

Within a silane group in the polyester of formula (I), each $R^1$ and $R^2$ is independent from each other for said residues. For example, polyesters of formula (I) with end groups are possible, which are ethoxydimethoxysilane end groups ($R^2$=methyl, $R^2$=methyl, $R^2$=ethyl).

In the present document, substance names beginning with "poly", such as polyol or polyisocyanate, designate substances formally containing per molecule two or more functional groups that are part of their name.

In the present document, the term "polymer" comprises on one hand a group of chemically homogeneous macromolecules that differ with respect to degree of polymerization, molecular mass and chain length, which was prepared by a polyreaction (polymerization, polyaddition, polycondensation). Said term also comprises derivatives of such a group of macromolecules obtained from polyreactions, i.e. compounds, obtained by reactions, such as additions or substitutions, of functional groups on existing macromolecules, and which may be chemically uniform or chemically non-uniform. The term also comprises so-called pre-polymers, i.e. reactive oligomeric pre-adducts, whose functional groups are involved in the construction of macromolecules.

The term "polyurethane polymer" comprises any polymer which is prepared by the so-called diisocyanate polyaddition process. This also includes those polymers that are virtually or entirely free from urethane groups. Examples of polyurethane polymers are polyether-polyurethanes, polyester-polyurethanes, polyether-polyureas, polyureas, polyester-polyureas, polyisocyanurates and polycarbodiimides.

In the present document, the terms "silane" or "organosilane" designates compounds, which on one hand, have at least one, usually two or three alkoxy groups or acyloxy groups, that are bound via Si—O-bonds directly to the silicon atom, and on the other hand, have at least one organic residue that is bound via a Si—C bond directly to the silicon atom. Such silanes are known to the person skilled in the art as organoalkoxysilanes or organoacyloxysilanes.

Accordingly, the term "silane group" designates the silicon-containing group that is bound to the organic residue of the silane that is bound via the Si—C bond. The silanes and their silane groups, respectively, are characterized in that they hydrolyze upon contact with moisture. This leads to formation of organosilanols, i.e., silicon-organic compounds containing one or more silanol groups (Si—OH groups), and by subsequent condensation reaction, to formation of organosiloxanes, i.e., silicon-organic compounds containing one or more siloxane groups (Si—O—Si groups).

The term "silane-functional" designates compounds having silane groups. Consequently, "silane-functional polymers" are polymers having at least one silane group.

Organosilanes whose organic residue have an amino group or a mercapto group are designated "aminosilanes" or "mercaptosilanes". Aminosilanes having a primary amino group, i.e., an $NH_2$ group which is bonded to an organic residue, are designated "primary aminosilanes". Aminosilanes having a secondary amino group, i.e., an NH group which is bonded to two organic residues, are designated "secondary aminosilanes".

In the present document, the term "molecular weight" is always understood to mean the average molecular weight Mn (number average).

In the present document, substances are considered "solid", if, without any external influence, they do not change their shape or are difficult to deform, for example, if they are not free-flowing. Accordingly, substances are considered "liquid" that can be deformed and are free-flowing, including viscous and pasty substances.

In the present document, "room temperature" refers to a temperature of 23° C.

Suitable hydroxy group-terminated polyesters P are, for example, polyesters prepared by known methods, for example, by the polycondensation of hydroxycarboxylic acids or polycondensation of aliphatic and/or aromatic polycarboxylic acids having di- or polyvalent alcohols.

For example, suitable are polyester polyols, which are prepared from di- to trivalent alcohols such as 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of said alcohols, and organic dicarboxylic acids or anhydrides or esters thereof, such as succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic acid anhydride or mixtures of said acids, and also polyester polyols formed from lactones such as ε-caprolactone.

For example, suitable are polyesterdiols, for example, those prepared from adipic acid, azelaic acid, sebacic acid, dodecane dicarboxylic acid, dimer fatty acid, phthalic acid, isophthalic acid and terephthalic acid as dicarboxylic acid or from lactones such as ε-caprolactone and from ethylene glycol, diethylene glycol, neopentyl glycol, 1,4-butanediol, 1,6-hexanediol, dimer fatty alcohol, and 1,4-cyclohexane dimethanol as divalent alcohol.

For example, the hydroxy group-terminated polyester P is a crystalline polyester.

Furthermore, for example, the polyester P has an average molecular weight Mn of >2500 g/mol to 7000 g/mol. For example, the average molecular weight Mn of polyester P ranges from 3500 g/mol to 6000 g/mol.

In the exemplary molecular weight range, compared to chain-extended polyesters or polyesters with a non-homogeneous molecular weight distribution, the polyester P has improved crystallization properties which, when used as melt component in a composition, leads to an improved initial strength of said composition.

If polyester P is a crystalline polyester, for example, the crystallization point of the polyester P is not lower than 30° C. below the melting point of polyester P.

Compositions comprising an inventive reactive melt component based on a polyester P, in which the crystallization point of the polyester P is less than 30° C. below the melting point of the polyester P, can be used, because then the period can be shortened from the application of the composition having a molten melt component, until sufficient initial strength caused by crystallization of the melt component is reached. For example, substrates, which are bonded together using an adhesive based on compositions comprising an inventive reactive melt component, do not, or only for a short period of time, need to be fixed so that they do not shift relative to each other until reaching sufficient initial strength of the adhesive. This can be advantageous for vertical bonds, such as when bonding a windshield of a vehicle or of a means of transportation.

Inventive silane-functional polyesters of formula (I) are typically obtainable by reaction of an isocyanate silane IS of formula (II) with a polyester P described above.

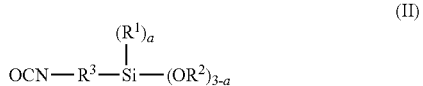

(II)

$R^1$, $R^2$, $R^3$ and a have already been described above.

This reaction takes place in a stoichiometric ratio of 1:1 of isocyanate groups to the hydroxy groups of the polyester P, or with a slight excess of hydroxy groups, for example at temperatures of 20° C. to 100° C., optionally in the presence of catalysts.

Examples of suitable isocyanatosilanes IS of formula (II) are 3-isocyanatopropyltrimethoxysilane, 3-isocyanatopropyldimethoxymethylsilane, and analogs thereof having silicon ethoxy or isopropoxy groups instead of methoxy groups.

A second exemplary aspect relates to the use of a silane-functional polyester according to the above description as a component in moisture-curing adhesives, sealants or coatings based on silane-terminated polymers, for example, in moisture-curing adhesives.

Suitable moisture-curing adhesives, sealants or coating based on silane-terminated polymers are, for example, moisture-curing compositions comprising at least one silane-functional polymer STP, for example, having end groups of formula (III).

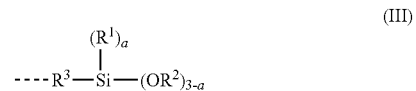

(III)

$R^1$, $R^2$, $R^3$ and a have already been described above.

In a first exemplary embodiment, the silane-functional polymer STP is a silane-functional polyurethane polymer STP1, which is obtainable by the reaction of a silane having at least one isocyanate-reactive group, with a polyurethane polymer containing isocyanate groups. For example, this reaction is carried out in a stoichiometric ratio of 1:1 of isocyanate-reactive groups to isocyanate groups or with a slight excess of isocyanate-reactive groups, so that the resulting silane-functional polyurethane polymer STP1 is entirely free of isocyanate groups.

For example, the silane having at least one isocyanate-reactive group is a mercaptosilane or an aminosilane, for example, an aminosilane.

For example, the aminosilane AS is an aminosilane of formula (IV),

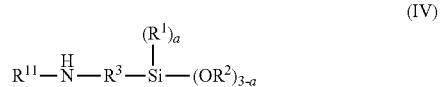

(IV)

wherein $R^1$, $R^2$, $R^3$ and a have already been described above, and $R^{11}$ is a hydrogen atom or a linear or branched hydrocarbon residue having 1 to 20 carbon atoms, which optionally contains cyclic portions, or is a residue of formula (V).

(V)

Here, residues $R^{12}$ and $R^{13}$ are each independently a hydrogen atom or a residue selected from the group consisting of —$R^{15}$, —CN and —COOR$^{15}$.

Residue $R^{14}$ is a hydrogen atom or a residue selected from the group consisting of —CH$_2$—COOR$^{15}$, —COOR$^{15}$, CONHR$^{15}$—, —CON(R$^{15}$)$_2$, —CN, —NO$_2$, —PO(OR$^{15}$)$_2$, —SO$_2$R$^{15}$, and SO$_2$OR$^{15}$.

Residue $R^{15}$ is a hydrocarbon residue having 1 to 20 carbon atoms, optionally containing at least one heteroatom.

Examples of suitable aminosilanes AS of formula (IV) include primary aminosilanes such as 3-aminopropyltrimethoxysilane, 3-aminopropyldimethoxymethylsilane; secondary aminosilanes such as N-butyl-3-aminopropyltrimethoxysilane, N-phenyl-3-aminopropyltrimethoxysilane, the products of the Michael-type addition of primary aminosilanes such as 3-aminopropyltrimethoxysilane or 3-aminopropyldimethoxymethylsilane to Michael acceptors such as acrylonitrile, acrylates and methacrylates, acrylic or methacrylic amides, diesters of maleic acid and fumaric acid, citraconic diesters and itaconic diesters, such as dimethyl- and diethyl N-(3-trimethoxysilylpropyl)-amino-succinates, and analogs of said aminosilanes having silicon ethoxy or isopropoxy groups instead of the methoxy groups. For example, suitable as aminosilanes AS are secondary aminosilanes, for example, aminosilanes AS, in which R11 in formula (IV) is not H. Examples are Michael-type adducts, for example, diethyl N-(3-trimethoxysilylpropyl)-amino-succinate.

In the present document, the term "Michael acceptor" designates compounds which, due to the double bonds they contain which are activated by electron acceptor residues, are able to undergo nucleophilic addition reactions with primary amino groups ($NH_2$) groups in a Michael addition analogous manner (hetero-Michael addition).

Polymers suitable as isocyanate group-containing polyurethane polymer for the preparation of a silane-functional polyurethane polymer STP1 are those, for example, which are obtainable by reaction of at least one polyol with at least one polyisocyanate, for example, a diisocyanate. This reaction can take place by reacting the polyol and the polyisocyanate using standard methods, for example, at temperatures of 50° C. to 100° C., optionally in the presence of suitable catalysts, with the polyisocyanate being added in an amount such that its isocyanate groups in relation to the hydroxy groups of the polyol are present in a stoichiometric excess.

For example, the excess of polyisocyanate is chosen such that, once all hydroxy groups of the polyol have reacted, in the resulting polyurethane polymer a content of free isocyanate groups of 0.1 to 5 wt.-%, for example, 0.1 to 2.5 wt.-%, for example, 0.2 to 1 wt.-%, based on the total polymer, is remaining.

Optionally, the polyurethane polymer can be prepared in the presence of plasticizers, wherein the plasticizers used do not contain any isocyanate-reactive groups.

Examples are polyurethane polymers with the above-mentioned content of free isocyanate groups, which are obtained from the reaction of diisocyanates with high-molecular-weight diols in an NCO:OH ratio ranging from 1.5:1 to 2:1.

Suitable polyols are, for example, polyether polyols, polyester polyols and polycarbonate polyols, and mixtures of said polyols.

Suitable polyether polyols, also called polyoxyalkylene polyols or oligoetherols, for example, are those which are polymerization products of ethylene oxide, 1,2-propylene oxide or 2,3-butylene oxide, oxetane, tetrahydrofuran, or mixtures thereof, optionally polymerized with the aid of a starter molecule with two or more active hydrogen atoms such as, for example, water, ammonia or compounds having two or more OH or NH groups such as 1,2-ethanediol, 1,2- and 1,3-propanediol, neopentyl glycol, diethylene glycol, triethylene glycol, the isomeric dipropylene glycols and tripropylene glycols, the isomeric butane diols, pentane diols, hexane diols, heptane diols, octane diols, nonane diols, decane diols, undecane diols, 1,3- and 1,4-cyclohexane dimethanol, bisphenol A, hydrogenated bisphenol A, 1,1,1-trimethylol ethane, 1,1,1-trimethylol propane, glycerol, aniline, and mixtures of said compounds. Also suitable are both polyoxyalkylene polyols having a low degree of unsaturation (measured according to ASTM D-2849-69 and expressed in milliequivalents unsaturation per gram of polyol (meq/g)), prepared, for example, with the aid of so-called double metal cyanide complex catalysts (DMC catalysts), and polyoxyalkylene polyols having a higher degree of unsaturation, prepared, for example, with the aid of anionic catalysts such as NaOH, KOH, CsOH or alkali alcoholates.

For example, suitable are polyoxyethylene polyols and polyoxypropylene polyols, for example, polyoxyethylene diols, polyoxypropylene diols, polyoxyethylene triols and polyoxypropylene triols.

For example, suitable are polyoxyalkylene diols or polyoxyalkylene triols having a degree of unsaturation of less than 0.02 meq/g and having a molecular weight ranging from 1,000 to 30,000 g/mol, and polyoxyethylene diols, polyoxyethylene triols, polyoxypropylene diols and polyoxypropylene triols having a molecular weight of 400 to 8000 g/mol.

Likewise, for example, suitable are so-called ethylene oxide-terminated ("EO-endcapped", ethylene oxide-endcapped) polyoxypropylene polyols. The latter are special polyoxypropylene polyoxyethylene polyols which are obtained, for example, by further alkoxylating pure polyoxypropylene polyols, for example, polyoxypropylene diols after completion of the polypropoxylation reaction using ethylene oxide, and therefore having primary hydroxy groups. In this case, examples are polyoxypropylene polyoxyethylene diols and polyoxypropylene polyoxyethylene triols.

Also suitable are styrene-acrylonitrile grafted polyether polyols, commercially available, for example, from Elastogran GmbH, Germany, under the trade name Lupranol®.

Suitable as polyester polyols are, for example, polyesters, such as those described above as polyester P, wherein the molecular weight of these polyester polyols, which are used for the preparation of the silane-functional polymer P, is chosen such that the polyester polyols are liquid at room temperature.

Suitable as polycarbonate polyols are, for example, those which are obtainable by reacting, for example, said alcohols mentioned above, used for construction of the polyester polyols, with dialkyl carbonates such as dimethyl carbonate, diaryl carbonates such as diphenyl carbonate, or phosgene. For example, suitable are polycarbonate diols, for example, amorphous polycarbonate diols.

Other suitable polyols are poly(meth)acrylate polyols.

Also suitable are polyhydroxyfunctional fats and oils, for example, natural fats and oils, for example, castor oil, or so-called oleochemical polyols which are obtained by chemical modification of natural fats or oils, for example, epoxy polyester or epoxy polyether which are obtained by epoxidation of unsaturated oils and subsequent ring opening using carboxylic acids or alcohols, or polyols obtained by hydroformylation and hydrogenation of unsaturated oils. Furthermore, it includes polyols, which are obtained from natural fats and oils by degradation processes such as alcoholysis or ozonolysis and subsequent chemical linking, for example, by transesterification or dimerization of the resulting degradation products or derivatives thereof. Suitable degradation products from natural fats and oils are, for example, fatty acids and fatty alcohols, and fatty acid esters, for example, methyl esters (FAME), which, for example, can be derivatized by hydroformylation and hydrogenation to form hydroxy fatty acid esters.

Also useful are furthermore polyhydrocarbonpolyols, also called oligohydrocarbonols, for example, polyhydroxy-functional ethylene-propylene-, ethylene-butylene- or ethylene-propylene-diene copolymers, such as those produced, for example, by Kraton Polymers, USA, or polyhydroxy-functional copolymers of dienes such as 1,3-butadiene or diene mixtures and vinyl monomers such as styrene, acrylonitrile or isobutylene, or polyhydroxy-functional polybutadiene polyols, such as those obtainable by copolymerization of 1,3-butadiene and allyl alcohol or by oxidation of polybutadiene, and which can also be hydrogenated.

Also suitable are polyhydroxy-functional acrylonitrile/butadiene copolymers, which can be prepared, for example, from epoxides or amino alcohols and carboxy-terminated acrylonitrile/butadiene copolymers (commercially available from Emerald Performance Materials, LLC USA, under the name Hypro® CTBN).

Said polyols, for example, have an average molecular weight of 250 to 30,000 g/mol, for example, from 1,000 to 30,000 g/mol, and an average OH functionality in the range of 1.6 to 3.

For example, suitable polyols are polyether polyols, for example, polyoxyethylene polyol, polyoxypropylene polyol and polyoxypropylene polyoxyethylene polyols, for example, polyoxyethylene diol, polyoxypropylene diol, polyoxyethylene triol, polyoxypropylene triol, polyoxypropylene polyoxyethylene diol and polyoxypropylene polyoxyethylene triol.

In addition to said polyols, small amounts of low molecular weight di- or polyvalent alcohols such as 1,2-ethanediol, 1,2- and 1,3-propanediol, neopentyl glycol, diethylene glycol, triethylene glycol, the isomeric dipropylene glycols and tripropylene glycols, the isomeric butane diols, pentane diols, hexane diols, heptane diols, octane diols, nonane diols, decane diols, undecane diols, 1,3- and 1,4-cyclohexane dimethanol, hydrogenated bisphenol A, dimeric fatty alcohols, 1,1,1-trimethylol ethane, 1,1,1-trimethylol propane, glycerol, pentaerythritol, sugar alcohols such as xylitol, sorbitol or mannitol, sugars such as sucrose, other higher-valent alcohols, low-molecular-weight alkoxylation products of said di- and poly-valent alcohols, and mixtures of said alcohols may also be used in the preparation of isocyanate group-containing polyurethane polymer.

Commercially available polyisocyanates, for example, diisocyanates can be used as suitable polyisocyanates for the preparation of the polyurethane polymer.

Suitable diisocyanates are, for example, 1,6-hexamethyelene diisocyanate (HDI), 2-methylpentamethylene-1,5-diisocyanate, 2,2,4- and 2,4,4-trimethyl-1,6-hexamethylene diisocyanate (TMDI), 1,12-dodecamethylene diisocyanate, lysine- and lysine ester diisocyanate, cyclohexane-1,3-diisocyanate, cyclohexane-1,4-diisocyanate, 1-isocyanato-3,3,5-trimethyl-5-isocyanatomethyl cyclohexane (isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)-naphthalene, 2,4- and 2,6-toluene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanato-benzene, naphthalene-1,5-diisocyanate (NDI), 3,3'-dimethyl-4,4'-diisocyanatodiphenyl (TODI), oligomers and polymers of said isocyanates, and any mixture of said isocyanates.

For example, suitable silane-functional polymers STP1 are commercially available from Hanse Chemie AG, Germany, under the trade name Polymer ST50, and from Bayer MaterialScience AG, Germany, under the trade name Desmoseal®.

In a second exemplary embodiment, the silane-functional polymer STP is a silane-functional polyurethane polymer STP2 obtainable by reacting a isocyanatosilane IS of formula (II), as described above, with a polymer having isocyanate-reactive functional end groups, for example, hydroxy groups, mercapto groups and/or amino groups. This reaction takes place at a stoichiometric ratio of 1:1 of isocyanate groups to isocyanate-reactive functional end groups, or, at a slight excess of isocyanate-reactive functional end groups, for example at temperatures of 20° C. to 100° C., optionally in presence of catalysts.

For example, the polymer has hydroxy groups as isocyanate-reactive functional end groups.

Suitable hydroxy group-containing polymers on the one hand are said high-molecular-weight polyoxyalkylene polyols, for example, polyoxypropylene diols having a degree of unsaturation of less than 0.02 meq/g and having a molecular weight ranging from 4,000 to 30,000 g/mol, for example, those having a molecular weight ranging from 8,000 to 30,000 g/mol.

On the other hand, polyurethane polymers having hydroxy groups, for example, terminal hydroxy groups, are also suitable for reaction with isocyanatosilanes IS. Such polyurethane polymers are obtainable by the reaction of at least one polyisocyante with at least one polyol. This reaction can take place by reacting the polyol and the polyisocyanate using standard methods, for example at temperatures of 50° C. to 100° C., optionally in the presence of suitable catalysts, with the polyol being added in an amount such that its hydroxy groups in relation to the isocyanate groups of the polyisocyanate are present in stoichiometric excess. For example, is a ratio of hydroxy groups to isocyanate groups of 1.3:1 to 4:1, for example, from 1.8:1 to 3:1. Optionally, the polyurethane polymer can be prepared in the presence of plasticizers, wherein the plasticizers used do not contain any isocyanate-reactive groups. Suitable for this reaction are the same polyols and polyisocyanates that were already mentioned as suitable for the preparation of a isocyanate group-containing polyurethane polymer, which is used to prepare a silane-functional polyurethane polymer STP1.

For example, suitable silane-functional polymers STP2 are commercially available from Momentive Performance Materials Inc., USA, under the trade name SPUR+® 1010LM, 1015LM and 1050MM, and from Wacker Chemie AG, Germany, under the trade name Geniosil® STP-E15, STP 10 and STP-E35.

In a third exemplary embodiment, the silane-functional polymer STP is a silane-functional polymer STP3 which is obtainable by a hydrosilylation reaction of polymers having terminal double bonds such as poly(meth)acrylate polymers or polyether polymers, for example, of allyl-terminated polyoxyalkylene polymers, as described, for example, in U.S. Pat. No. 3,971,751 and U.S. Pat. No. 6,207,766, the disclosure of which is incorporated herein by reference.

For example, suitable silane-functional polymers STP3 are commercially available from Kaneka Corp., Japan, under the trade name MS Polymer®, for example, MS-Polymer® S203H, S303H, S227, S810, MA903 and S943, Silyl® SAX220, SAX350, SAX400 and SAX725, Silyl® SAT350 and SAT400, and XMAP®, SA100S and SA310S, and from Asahi Glass Co., Ltd., Japan, under the trade name Excestar® S2410, S2420, S3430, S3630, W2450 and MSX931.

Typically, the silane-functional polymer STP is present in an amount of 10 to 80 wt.-%, for example, in an amount of 15 to 60 wt.-%, based on the total composition.

An example is the use of a silane-functional polyester according to the above description in moisture-curing adhesives, sealants or coatings polymer materials based on silane-functional polyurethane polymers, for example, on silane-functional polyurethane polymer of type STP1.

In another aspect, a silane-functional polyester according to the above description can be used as a component in a moisture-curing adhesive, wherein said adhesive is a two-component, moisture-curing adhesive consisting of a component A comprising at least one silane-functional polyester of formula (I), as described above, and at least one silane-terminated polymer STP, and a component B comprising water.

For example, component A of the two-component, moisture-curing adhesive corresponds to a moisture-curing composition as described above and, accordingly, has a composition such that it can cure completely on its own by humidity. Such cured adhesive provides comparable final strength values as the mixture of components A and B after curing.

Component B is, for example, a water-containing paste, in which the water contained therein is thickened by at least one carrier material, which is typically selected from the group consisting of a plasticizer, a thickening agent and a filler.

The water content in component B can be varied depending on the embodiment of component A. It is obvious to a person skilled in the art that the amount of component B is dependent on the quantity of water contained therein. If, for example, component B contains a high water content of >50 wt.-%, component B is typically used in an amount of 1 to 10 wt.-%, based on the amount of component A. If component B, however, contains, for example, only about 5 wt.-% of water, component B can be used also in an amount of about 50 wt.-%, based on the amount of component A.

For example, the water content of the entire two-component composition lies in a range such that the water present is sufficient to react 50 to 100% of all reactive groups in the composition.

For example, the described two-component composition is used such that the weight ratio of component A to component B≥1:1, for example, 3:1 to 70:1, for example, from 10:1 to 20:1.

In the case of a two-component, moisture-curing adhesive, components A and B are typically stored in separate packaging or in a single packaging, which has two compartments separated from each other. In this case, component A is present in one compartment and component B is present in the other compartment of the packaging. Suitable packaging includes, for example, dual cartridges, such as twin or coaxial cartridges, or multi-compartment tube bags with adapter. For example, mixing of the two components A and B is carried out using a static mixer, which can be placed on the packaging with two compartments.

Such suitable packaging is described, for example, in US 2006/0155045 A1, WO 2007/096355 A1 and in US 2003/0051610 A1, the entire disclosure of which is incorporated herein by reference.

In a large-scale plant, the two components A and B are typically stored separately in drums or buckets, and when applied they are squeezed out and mixed, for example, by means of gear pumps. The composition can be applied on a substrate by hand or in an automated process via robot.

In a further exemplary aspect, disclosed is the use of a silane-functional polyester according to the above description as a reactive melt component in moisture-curing warm- or hot-melt adhesives based on silane-terminated polymers, as described above. Here, the inventive silane-functional polyesters of formula (I) are solid at room temperature and are melted by heating of the moisture-curing warm- or hot-melt adhesive. After applying the adhesive in a heated state, on one hand, it solidifies on cooling by crystallization of the melt component, and on the other hand, it crosslinks via a reaction with water. The water may come either from the air (humidity), or may be added to the adhesive, for example, in the form of a water-containing component, such as described above.

Warm-melt adhesives are typically applied at temperatures of about 40° C. to 80° C. The application temperature of hot-melt adhesives is typically about 80° C. Of course, it is obvious to a person skilled in the art that these ranges overlap and there is no sharp separation between warm- and hot-melt adhesives.

Here, warm- or hot-melt adhesives are not only adhesives that are completely solid at room temperature, but also those which are liquid at room temperature, however, containing a melt component which is solid at room temperature.

Compared with a purely reactive warm- or hot-melt adhesive, where the entire reactive polymer component is used as melt component, such an adhesive can have the advantage that even after application it still has certain deformability, allowing for minor corrections in large-surface bonding. Compared with moisture-curing adhesives, which have no melt component, such an adhesive can have the advantage that it has a significantly improved initial strength.

In another aspect, a composition is disclosed comprising
at least one silane-functional polyester of formula (I) according to the above description, and
at least one silane-terminated polymer STP, as described above as a component of the moisture-curing adhesive, sealant or coating.

For example, the silane-functional polymer STP is a silane-functional polyurethane polymer, for example, a silane-functional polyurethane polymer of type STP1.

For example, the composition further comprises at least one filler. The filler impacts both the rheological properties of the uncured composition and the mechanical properties and surface properties of the cured composition. Suitable fillers include inorganic and organic fillers, such as natural, ground or precipitated calcium carbonates, which are optionally coated with fatty acids, for example, stearic acid, barium sulfate ($BaSO_4$, also called barite or heavy spar), and calcinated kaolin, aluminum oxide, aluminum hydroxide, silicic acids, for example, highly disperse silicic acids from pyrolysis, carbon blacks, for example, industrially produced carbon black (carbon black, hereinafter referred to as "carbon black"), PVC powders or hollow beads. Exemplary fillers are calcium carbonate, calcinated kaolin, carbon black, highly disperse silicic acids, and flame-retardant fillers, such as hydroxides or hydrates, for example, hydroxides or hydrates of aluminum, for example, aluminum hydroxide.

It is quite possible and may even be advantageous to use a mixture of different fillers.

An appropriate amount of filler lies, for example, in the range of 20 to 60 wt.-%, for example, 30 to 60 wt.-%, based on the total composition.

Furthermore, the inventive composition contains, for example, at least one catalyst for the crosslinking said silane-functional polymers by means of moisture. For example, such catalysts include metal catalysts in the form of organo tin compounds such as dibutyltin dilaurate and dibutyltin diacetylacetonate, titanium catalysts, amino group-containing compounds, for example, 1,4-diazabicyclo[2.2.2]octane and 2,2'-dimorpholinodiethylether, aminosilanes, and mixtures of said catalysts.

Furthermore, the inventive composition additionally may contain other ingredients. Such ingredients are, for example, plasticizers such as esters of organic carboxylic acids or their anhydrides, for example phthalates such as dioctyl phthalate, diisononyl phthalate or diisodecyl phthalate, adipates such as dioctyl adipate, azelates and sebacates, polyols such as polyoxyalkylene polyols or polyester polyols, organic phosphoric and sulfonic acid esters or polybutenes; solvents; fibers such as those made of polyethylene; dyes; pigments, rheology modifiers such as thickeners or thixotropic endowning agents, such as urea compounds of the type described as thixotropic endowning agents ("thixotropy endowning agent") in WO 02/48228 A2 on pages 9 to 11; polyamide waxes, bentonites or pyrogenic silicic acids, adhesion promoters, such as epoxy silanes, (meth)acrylsilanes, anhydridosilanes or adducts of said silanes with primary aminosilanes, and aminosilanes or ureasilanes; crosslinkers such as silane-functional oligomers and polymers, drying agents such as vinyltrimethoxysilane, α-functional silanes such as N-(silylmethyl)-O-methyl carbamates, for example, N-(methyldimethoxysilylmethyl)-O-methyl carbamate, (methacryloxymethyl)silanes, methoxymethylsilanes, N-phenyl-, N-cyclohexyl- and N-alkyl silanes, ortho formic acid esters, calcium oxide or molecular sieves, stabilizers, for example, protecting from heat, light and UV radiation; flame-retardant substances; surface-active substances such as wetting agents, leveling agents, air release agents or defoamers; biocides such as algicides, fungicides or fungal growth inhibitors, and other substances typically used in moisture-curing compositions.

Furthermore, optionally, so-called reactive diluents, which are incorporated into the polymer matrix during the curing of the composition, for example, by reaction with the silane groups, may be used.

It can be advantageous to select all components mentioned above that optionally may be present in the composition, for example, filler and catalyst, such that storage stability is not adversely affected by the presence of such component, i.e., that the composition with respect to its properties, for example, application and curing properties, does not change or only slightly changes on storage. This can require that reactions leading to the chemical curing of the composition described, for example, of silane groups, do not occur to any significant extent on storage. It can be advantageous that said components contain, or release upon storage, no water or only trace amounts of water. Therefore, it may be useful to dry certain ingredients chemically or physically before blending them with the composition.

The composition described above is, for example, prepared and stored under exclusion of moisture. Typically, the composition is storage-stable, i.e., under exclusion of moisture in a suitable package or arrangement, such as a drum, a bag or a cartridge, it can be stored over a period of several months to a year and longer without changing to an extent relevant to its use with respect to its application properties or its properties after curing.

When applying the composition described to at least one solid object or item, the silane groups of the polymer come in contact with moisture. The silane groups are characterized in that they hydrolyze upon contact with moisture. This leads to the formation of organosilanols and, by subsequent condensation reactions to organosiloxanes. As a result of these reactions, which can be accelerated by the use of catalysts, curing of the composition takes place. This process is referred to as crosslinking.

The water required for the curing can originate either from the air (humidity), or the composition described above may be brought in contact with a water-containing component, for example, by coating, for example with a smoothing agent, or by spraying; or a water-containing component can be added to the composition during application, for example, in the form of a water-containing paste which is mixed in, for example, via a static mixer. When curing is caused by humidity, the composition cures from outside to inside. The rate of the curing process is determined by various factors, such as the rate of diffusion of water, the temperature, the ambient humidity and the bonding geometry, and generally slows down as curing progresses.

The exemplary composition is, for example, used in a method of bonding two substrates S1 and S2, comprising the steps
i) applying a composition according to the description above to a substrate S1 and/or a substrate S2;
ii) contacting substrates S1 and S2 via the applied composition within the open time of the composition;
iii) curing the composition by means of water;
wherein substrates S1 and S2 are the same or different from each other.

Furthermore, the exemplary composition can also be used in a process of sealing or coating, comprising the steps
i') applying a composition according to the description above to a substrate S1 and/or between two substrates S1 and S2;
ii') curing the composition by means of water, for example, in the form of humidity;
wherein substrates S1 and S2 are the same or different from each other.

If the exemplary composition is a warm- or hot-melt adhesive, step i) or i') of the application of the composition is preceded by a step of heating the adhesive, in which the inventive polyester of formula (I) is melted as a melt component.

If the exemplary composition is a two-component composition, step i) or i') of the application of the composition is preceded by a step of mixing the two components A and B.

If the exemplary composition is a two-component warm- or hot-melt adhesive, step i) or i') of the application of the composition is preceded by a step of heating the adhesive, for example, component A, and the subsequent mixing of the two components A and B.

Suitable substrates S1 and/or S2 are, for example, substrates that are selected from the group consisting of concrete, mortar, brick, tile, plaster, a natural stone such as granite or marble, glass, ceramic, metal or metal alloy, wood, plastic and paint.

An exemplary composition can be applied to the substrate using a suitable device, for example, in the form of a bead having, for example, an essentially circular or triangular cross-sectional area. Suitable methods for applying the composition include, for example, the application from commercial cartridges, which are operated manually, or by means of compressed air, or from a drum or bucket using a pump or an extruder, optionally by means of an application robot. An inventive composition with good application properties has high stability and short stringing. This means, after application it remains in the applied form, i.e. does not spread out, and, upon removal of the application device, forms no or only a very short string, so that the substrate does not become dirty.

Further disclosed is a cured composition that is obtainable by the reaction of a composition described above with water, for example, in the form of humidity.

The articles, which are bonded, sealed or coated with an inventive composition, are, for example, an industrially manufactured good or a consumer product, for example, a window, a household appliance, or a means of transportation, for example, a vehicle, or an attachment part of a vehicle.

EXAMPLES

Exemplary embodiments are shown below in more detail. The invention is not limited to said embodiments described herein.

Test Methods

The melting point ("mp") and the crystallization point ("cp.") were determined by DSC (differential scanning calorimetry) on a DSC822e instrument from Mettler Toledo, Switzerland, with an automatic sampling device (Mettler Toledo Sample Robot TS0801 RO). The samples underwent the following cycle: 1) for 1 minute at 15° C. (constant temperature); 2) heating from 15° C. to 100° C. (temperature gradient+10° C./min); 3) 1 minute at 100° C. (constant temperature); 4) cooling from 100° C. to 15° C. (temperature gradient−10° C./min), 5) for 5 minutes at 15° C. (constant temperature), 6) heating from 15° C. to 100° C. (temperature gradient+10° C./min).

Melt components with a crystallization point below temperatures in the range of room temperature (23° C.) are only conditionally suitable and, in an exemplary embodiment are not preferred, since the crystallization of the melt component is supposed to take place at room temperature. Also not preferred in an exemplary embodiment, are melt components whose crystallization point is more than 30° C. below their melting point, because in this case it takes a relatively long time until a sufficient initial strength is reached.

The E module at 0 to 5% strain was determined in accordance with DIN EN 53504 (tensile speed: 200 mm/min) on films having a thickness of 2 mm, cured over 7 days at 23° C. and 50% relative humidity.

The Shore A hardness was determined in accordance with DIN 53505 on specimens having a thickness of 6 mm, cured over 7 days at 23° C. and 50% relative humidity.

For the determination of the extrusion force ("APK") each composition was filled in a cartridge. Then, the cartridges were opened and a nozzle of 5 mm inner diameter was mounted. With an extrusion instrument "Zwick 1120" the force was determined that was needed to extrude the composition at an extrusion velocity of 60 mm/min. The specified value is an average of the forces measured after 22 mm, 24 mm, 26 mm and 28 mm. After extrusion for 30 mm it was stopped. Similarly, the extrusion force at 70° C. was determined. Here, the cartridges were heated to a temperature of 70° C. prior to the determination of the extrusion force.

The initial strength of the compositions was determined using the sliding behavior of the adhesive under static loading. Here, a triangular-shaped adhesive bead (width: 10 mm, height: 12 mm) was applied horizontally on a vertically positioned pane of glass at a temperature of 70° C., after 30 seconds compressed to 5 mm over the entire width of 40 mm of the largest area of a glass control specimen (equivalent to 30 g/cm) using a glass control specimen (100×40×6 mm) having a mass of 120 g, and fixed for 30 seconds. Then, the restraint was removed and the slip down distance ("slip down") of the glass control specimen was measured after 2 minutes. Compositions having a slip down distance of 0.5 mm or more have inadequate initial strength.

Preparation of the Melt Components

SKomp.1: 3600 g of Dynacoll® 7381 (Evonik Degussa GmbH, Germany, crystalline polyester, Mn=3500 g/mol, OH number 29.6) and 400 g of diisodecyl phthalate (DIDP, Palatinol® Z, BASF SE, Germany) were stirred under vacuum for 1 hour at 120° C. to remove water. The mixture was then cooled to 90° C. and the vacuum was broken using nitrogen. Under a nitrogen atmosphere 390.66 g of 3-isocyanatopropyltrimethoxysilane (Geniosil® GF-40, Wacker Chemie AG, Germany) and 5.28 g of di-n-butyltin dilaurate (Metatin® K 712, Acima AG, Switzerland) were blended into the mixture, and it was stirred at 90° C. until no free isocyanate groups could be detected titrimetrically.

SKomp.2: 250 g of Dynacoll® 7365 (Evonik Degussa GmbH, crystalline polyester, Mn=6500 g/mol, OH number 17.9) and 27.78 g of diisodecyl phthalate (Palatinol® Z) were stirred under vacuum for 1 hour at 120° C. to remove water. The mixture was then cooled to 90° C. and the vacuum was broken using nitrogen. Under a nitrogen atmosphere, 16.41 g of 3-isocyanatopropyltrimethoxysilane (Geniosil® GF-40) and 0.35 g of di-n-butyltin dilaurate (Metatin® K 712) were blended into the mixture and it was stirred at 90° C. until a constant content of free isocyanate groups of 0.09 wt.-% could be detected titrimetrically. As a correction, 20.34 g of Dynacoll® 7365 was blended into the mixture until no free isocyanate groups could be detected titrimetrically.

SKomp.3: 250 g of Dynacoll® 7362 (Evonik Degussa GmbH, crystalline polyester, Mn=2000 g/mol, OH number 60.0) and 27.78 g of diisodecyl phthalate (Palatinol® Z) were stirred under vacuum for 1 hour at 120° C. to remove water. The mixture was then cooled to 90° C. and the vacuum was broken using nitrogen. Under a nitrogen atmosphere, 54.99 g of 3-isocyanatopropyltrimethoxysilane (Geniosil® GF-40) and 0.40 g of di-n-butyltin dilaurate (Metatin® K 712) were blended into the mixture and it was stirred at 90° C. until a constant content of free isocyanate groups of 0.26 wt.-% could be detected titrimetrically. As a correction, 19.52 g of Dynacoll® 7362 was blended into the mixture until no free isocyanate groups could be detected titrimetrically.

SKomp.4: 250 g of Dynacoll® 7250 (Evonik Degussa GmbH, liquid polyester, Mn=5500 g/mol, OH number 22.5) and 27.78 g of diisodecyl phthalate (Palatinol® Z) were stirred under vacuum for 1 hour at 120° C. to remove water. The mixture was then cooled to 90° C. and the vacuum was broken using nitrogen. Under a nitrogen atmosphere, 20.62 g of 3-isocyanatopropyltrimethoxysilane (Geniosil® GF-40) and 0.36 g of di-n-butyltin dilaurate (Metatin® K 712) were blended into the mixture, and it was stirred at 90° C. until a constant content of free isocyanate groups of 0.28 wt.-% could be detected titrimetrically. As a correction, 48.99 g of Dynacoll® 7250 was blended into the mixture until a content of free isocyanate groups of 0.09 wt.-% was reached.

SKomp.5: 250 g of Dynacoll® PEG 4000 (polyethylene glycol 4000, Fluka Chemie GmbH, Switzerland, Mn=4000 g/mol, OH number 32.0) and 27.78 g of diisodecyl phthalate (Palatinol® Z) were stirred under vacuum for 1 hour at 120° C. to remove water. The mixture was then cooled to 90° C. and the vacuum was broken using nitrogen. Under a nitrogen atmosphere, 29.33 g of 3-isocyanatopropyltrimethoxysilane (Geniosil® GF-40) and 0.37 g of di-n-butyltin dilaurate (Metatin® K 712) were blended into the mixture, and it was stirred at 90° C. until no free isocyanate groups could be detected titrimetrically.

SKomp.6: 352 g of Dynacoll® 7362 and 27.78 g diisodecyl phthalate (Palatinol® Z) were stirred under vacuum for 1 hour at 120° C. to remove water. The mixture was then cooled to 90° C. and the vacuum was broken using nitrogen. Under a nitrogen atmosphere, 64.41 g of isophorone diisocyanate (Vestanat® IPDI, Evonik Degussa GmbH) and 0.27 g of di-n-butyltin dilaurate (Metatin® K 712) were blended into the mixture and it was stirred at 90° C. until a constant content of free isocyanate groups of 2.71 wt.-% could be detected titrimetrically. Then, 100.3 g of diethyl N-(3-trimethoxysilyl-propyl)-amino-succinate was added and stirred until no free isocyanate groups could be detected titrimetrically.

Diethyl-N-(3-trimethoxysilyl propyl)-amino-succinate was prepared as follows: were presented. At room temperature, with vigorous stirring, 12.87 g of maleic acid diethyl ester (Fluka Chemie GmbH, Switzerland) were added slowly to 13.4 g of 3-aminopropyltrimethoxysilane (Silquest® A-1110, Momentive Performance Materials Inc., USA) and the mixture was stirred for 2 hours at room temperature.

SKomp.7: 266 g of Dynacoll® 7365 and 27.78 g diisodecyl phthalate (Palatinol® Z) were stirred under vacuum for 1 hour at 120° C. to remove water. The mixture was then cooled to 90° C. and the vacuum was broken using nitrogen. Under a nitrogen atmosphere, 19.21 g of isophorone diisocyanate (Vestanat® IPDI) and 0.24 g of di-n-butyltin dilaurate (Metatin® K 712) were blended into the mixture, and it was stirred at 90° C. until a constant content of free isocyanate groups of 1.0 wt.-% could be detected titrimetrically. Then, 24.46 g of diethyl N-(3-trimethoxysilylpropyl)-amino-succinate was added and stirred until no free isocyanate groups could be detected titrimetrically.

Preparation of Silane-Functional Polyurethane Polymer SH

Under a nitrogen atmosphere, 1000 g of polyol Acclaim® 12200 (Bayer MaterialScience AG, Germany; low monol polyoxypropylene diol, OH number 11.0 mg KOH/g; water content about 0.02 wt.-%), 46.17 g of isophorone diisocyanate (Vestanat® IPDI), 261.72 g of diisodecyl phthalate (Palatinol® Z) and 0.14 g of di-n-butyltin dilaurate (Metatin® K 712) were heated under continuous stirring at 90° C. and kept at this temperature. After a reaction time of one hour, a content of free isocyanate group of 0.70 wt.-% titrimetrically was reached. Then, 69.88 g of diethyl N-(3-trimethoxysilylpropyl)-amino-succinate were added, and stirring was continued for an additional 2 to 3 hours at 90° C. The reaction was stopped once no more free isocyanate was detected by IR spectroscopy (2275-2230 cm$^{-1}$). The product was cooled to room temperature (23° C.) and stored under exclusion of moisture (theoretical polymer content=90%).

Preparation of Adhesives

According to the proportions by weight shown in Table 1, the silane-functional polyurethane polymer SH, diisodecyl phthalate (Palatinol® Z) and vinyltrimethoxysilane (Silquest® A-171 from Momentive Performance Materials Inc., USA) were thoroughly mixed in a vacuum mixer for 5 minutes. Then, dried, precipitated chalk (Socal® U1S2, Solvay SA, Belgium), dried carbon black (Monarch® 570 from Cabot Corp., USA), and the melt component (SKomp.1-SKomp.7), which had been melted for 2 days in an oven at 70° C., were kneaded for 15 minutes at 60° C. Then, with heating switched off, under vacuum N-(2-aminoethyl)-(3-aminopropyl)-trimethoxysilane (Silquest® A-1120 from Momentive Performance Materials Inc.) and di-n-butyltin dilaurate (Metatin® K712) as a 10% solution in DIDP were processed into a homogeneous paste over a period of 10 min. The same was then filled into inside-painted aluminum piston cartridges.

TABLE 1

| | 1 | 2 | Ref1 | Ref2 | Ref3 | Ref4 | Ref4 | Ref6 |
|---|---|---|---|---|---|---|---|---|
| SH | 50 | 50 | 50 | 50 | 50 | 50 | 50 | 50 |
| Palatinol ® Z | 5.5 | 5.5 | 5.5 | 5.5 | 5.5 | 5.5 | 5.5 | 5.5 |
| Silquest ® A-171 | 1 | 1 | 1 | 1 | 1 | 1 | 1 | 1 |
| Socal ® U1S2 | 20 | 20 | 20 | 20 | 20 | 20 | 20 | 20 |
| Monarch ® 570 | 17 | 17 | 17 | 17 | 17 | 17 | 17 | 17 |
| SKomp.1 | 4 | | | | | | | |
| SKomp.2 | | 4 | | | | | | |
| SKomp.3 | | | 4 | | | | | |
| SKomp.4 | | | | 4 | | | | |
| SKomp.5 | | | | | 4 | | | |
| SKomp.6 | | | | | | 4 | | |
| SKomp.7 | | | | | | | 4 | |
| Silquest ® A-1120 | 1 | 1 | 1 | 1 | 1 | 1 | 1 | 1 |
| Metatin ® K712 [a] | 1.5 | 1.5 | 1.5 | 1.5 | 1.5 | 1.5 | 1.5 | 1.5 |
| Mp [° C.] [b] | 65 | 55 | 51 | n.d. [c] | 62 | 49 | 55 | — |
| Cryst. point [° C.] [b] | 42 | 30 | 25 | n.d. [c] | 30 | 15 | 24 | — |
| E module [MPa] | 14.0 | 10.5 | 11.5 | 5.3 | 7.5 | 11 | 9 | 4.5 |
| Shore A | 72 | 70 | 72 | 64 | 72 | 73 | 69 | 61 |
| APK 23° C. [N] | >2000 | >2000 | >2000 | 1402 | >2000 | >2000 | >2000 | 865 |
| APK 70° C. [N] | 879 | 1251 | 997 | 891 | 563 | 595 | 987 | 442 |
| Slip down [mm] | 0 | 0 | 1 | 1.5 | 0 | 1 | 0.5 | 4 |

Compositions of the inventive adhesives 1 and 2 and of the reference examples Ref1 to Ref6 in wt.-% and the results of measurements; Ref6 does not contain any melt component;
[a] 10% solution in DIDP;
[b] melting and crystallization point were determined of the respective melt components alone;
[c] melt component SKomp.4 is liquid at room temperature, so that melting and crystallization points were not determined.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A silane-functional polyester of formula (I):

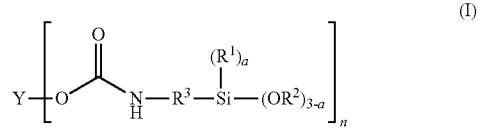

wherein

Y is an n-valent residue of a polyester P which is solid at room temperature and terminated by hydroxy groups, after removal of n hydroxy groups;

$R^1$ is a linear or branched, monovalent carbon residue having 1 to 12 carbon atoms, optionally having one or more C—C multiple bonds and/or having optionally cycloaliphatic and/or aromatic portions;

$R^2$ is an acyl residue or a linear or branched, monovalent hydrocarbon residue having 1 to 12 carbon atoms, optionally having one or more C—C multiple bonds and/or having optionally cycloaliphatic and/or aromatic portions;

$R^3$ is a divalent hydrocarbon residue having from 1 to 3 carbon atoms;

the variable a has a value of 0, 1 or 2; and the variable n has a value of 1 to 3, wherein the polyester P has an average molecular weight $M_n$ of 2500 g/mol to 6000 g/mol.

2. The silane-functional polyester according to claim 1, wherein the polyester P is a crystalline polyester.

3. The silane-functional polyester according to claim 2, wherein the crystallization point of the polyester P is less than 30° C. below the melting point of the polyester P.

4. The silane-functional polyester according to claim 1, wherein a has a value of 0 or 1.

5. The silane-functional polyester according to claim 1, wherein n has a value of 2.

6. The silane-functional polyester according to claim 1, wherein $R^2$ is an acyl or alkyl group having 1 to 5 carbon atoms.

7. A method for bonding two substrates S1 and S2, the method comprising:
   i) applying a composition comprising the polyester according to claim 1 on a substrate S1 and/or a substrate S2;
   ii) contacting the substrates S1 and S2 via the applied composition within an open time of the composition; and
   iii) curing the composition with water,
   wherein the substrates S1 and S2 are identical to or different from each other.

8. The method of claim 7, wherein the composition is a moisture-curing warm- or hot-melt adhesive, and wherein the method further comprises heating the composition prior to step i) to melt the polyester of formula (I).

9. A method for bonding, sealing or coating, the method comprising:
   i) applying a composition comprising the polyester according to claim 1 on a substrate S1 and/or between two substrates S1 and S2; and
   ii) curing the composition with water,
   wherein the substrates S1 and S2 are identical to or different from each other.

10. The method of claim 9, wherein the composition is a moisture-curing warm- or hot-melt adhesive, and wherein the method further comprises heating the composition prior to step i) to melt the polyester of formula (I).

11. A two-component moisture-curing adhesive, sealant or coating based on a silane-terminated polymer, comprising:
   a component A comprising at least one silane-functional polyester according to claim 1 and at least one silane-terminated polymer; and
   a component B comprising water.

12. The moisture-curing adhesive, sealant or coating, according to claim 11, wherein the silane-terminated polymer is a silane-terminated polyurethane polymer STP1.

13. A composition, comprising:
   at least one silane-functional polyester according to claim 1; and
   at least one silane-terminated polymer STP.

14. The composition according to claim 13, wherein the silane-terminated polymer is a silane-terminated polyurethane polymer STP1.

15. The silane-functional polyester according to claim 1, wherein $R^2$ is a methyl or an ethyl or an isopropyl group.

16. The silane-functional polyester according to claim 1, wherein $R^3$ is a divalent hydrocarbon residue having 3 carbon atoms.

17. The silane-functional polyester according to claim 1, wherein a has a value of 0 or 1; n has a value of 2; $R^2$ is an acyl or alkyl group having 1 to 5 carbon atoms; and $R^3$ is an alkylene residue having 1 to 3 carbon atoms.

18. The silane-functional polyester according to claim 1, wherein the polyester P has an average molecular weight $M_n$ of 2500 g/mol to 3500 g/mol.

19. The silane-functional polyester according to claim 1, wherein a crystallization point of the polyester P is not lower than 30° C. below a melting point of the polyester P.

* * * * *